United States Patent
Furuta

(10) Patent No.: US 12,466,230 B2
(45) Date of Patent: Nov. 11, 2025

(54) VEHICLE BEHAVIOR CONTROL DEVICE AND VEHICLE BEHAVIOR CONTROL METHOD

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 18/740,477

(22) Filed: Jun. 11, 2024

(65) Prior Publication Data

US 2025/0074133 A1 Mar. 6, 2025

(30) Foreign Application Priority Data

Sep. 5, 2023 (JP) .................................. 2023-143687

(51) Int. Cl.
 *B60G 21/055* (2006.01)
 *B60G 17/016* (2006.01)

(52) U.S. Cl.
 CPC ..... *B60G 21/0558* (2013.01); *B60G 17/0162* (2013.01); *B60G 17/0164* (2013.01); *B60G 2202/135* (2013.01); *B60G 2202/42* (2013.01)

(58) Field of Classification Search
 CPC ............ B60G 21/0558; B60G 17/0162; B60G 17/0164; B60G 2202/135; B60G 2202/42; B60G 11/50; B60G 2400/102; B60G 2400/208; B60G 2400/252; B60G 2800/01
 USPC ......................................................... 701/37
 See application file for complete search history.

(56) References Cited

U.S. PATENT DOCUMENTS

| 2010/0318262 | A1 | 12/2010 | Mizuta | |
| 2014/0232082 | A1* | 8/2014 | Oshita | B60G 17/0162 280/124.161 |
| 2019/0126976 | A1* | 5/2019 | Murayama | B60W 30/18145 |

FOREIGN PATENT DOCUMENTS

JP 2008-137446 A 6/2008

* cited by examiner

*Primary Examiner* — Yi-Kai Wang
(74) *Attorney, Agent, or Firm* — SoraIP, Inc.

(57) ABSTRACT

The vehicle behavior control device includes a controller and an actuator that applies a control force to wheels of the vehicle through position control by the controller. The actuator is configured to apply a control force to the wheel by deforming the transmission member. The controller is configured to calculate a required control force for the actuator, adjust the required control force in consideration of the assumed reaction force, and perform position control of the actuator based on the adjusted required control force. Here, the assumed reaction force is a reaction force generated in the transmission member due to at least one of acceleration/deceleration and steering of the vehicle when the position control of the actuator is zero.

5 Claims, 6 Drawing Sheets

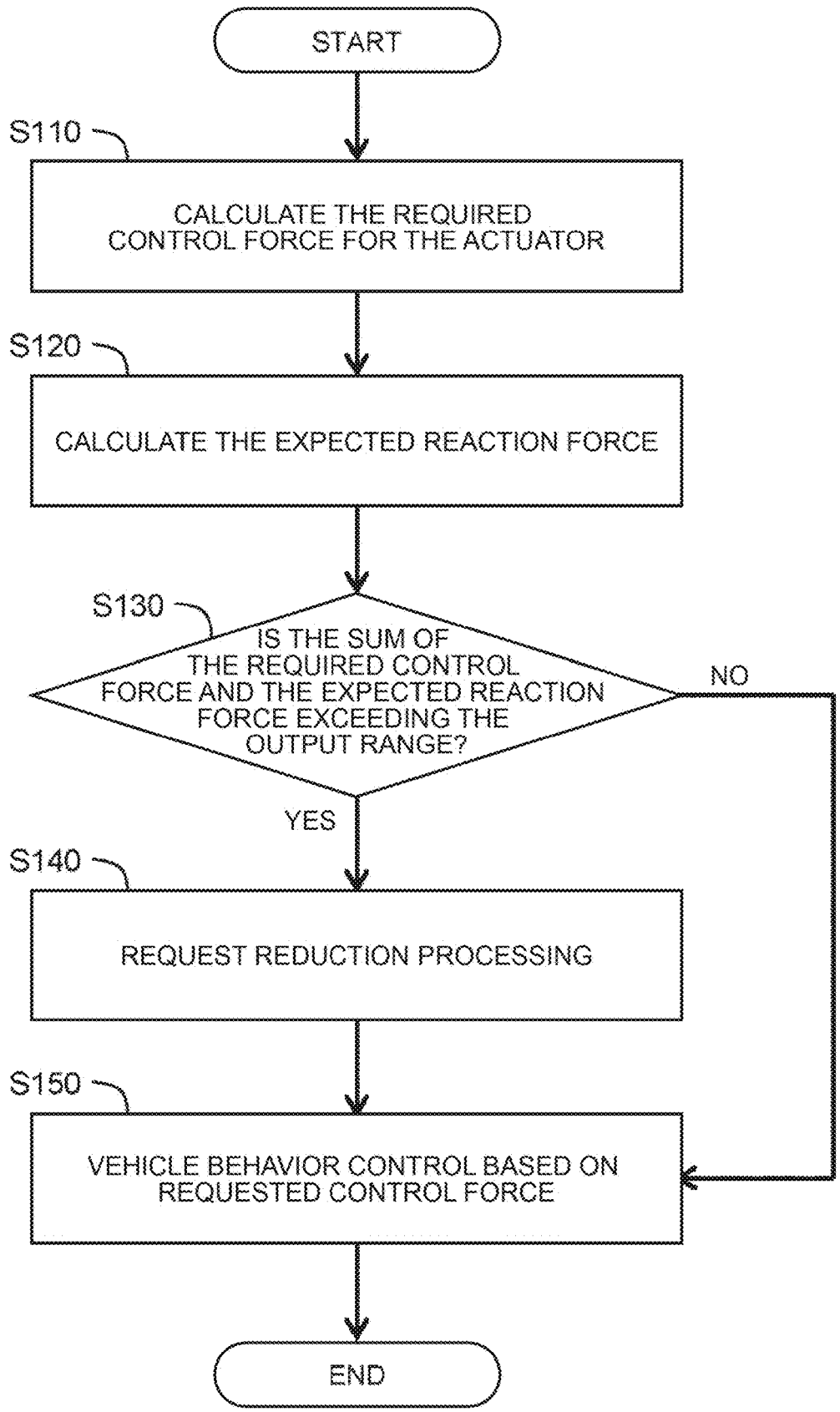

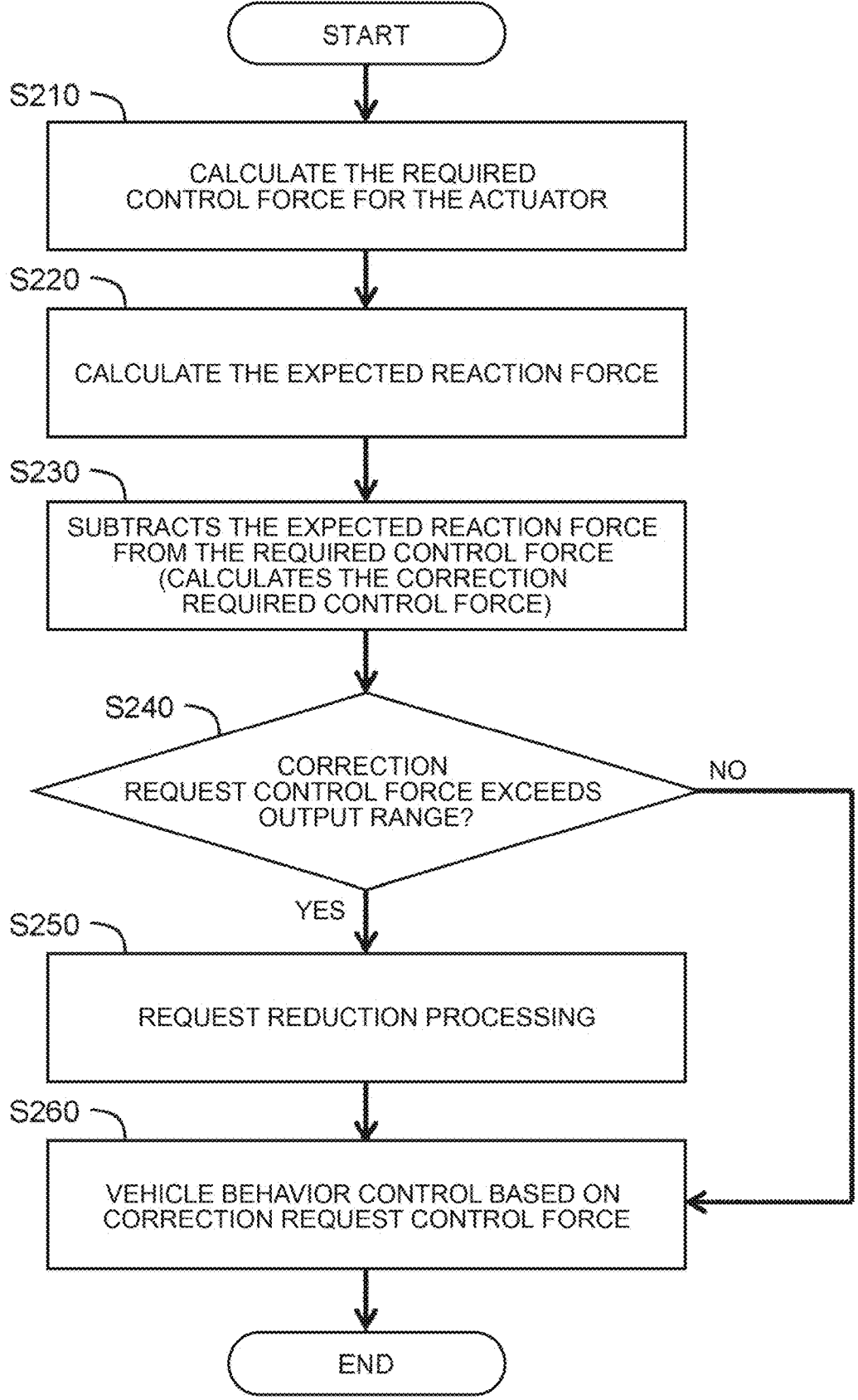

VEHICLE BEHAVIOR CONTROL DEVICE AND VEHICLE BEHAVIOR CONTROL METHOD

CROSS-REFERENCE TO RELATED APPLICATION

This application claims priority to Japanese Patent Application No. 2023-143687 filed on Sep. 5, 2023 incorporated herein by reference in its entirety.

BACKGROUND

1. Technical Field

The present disclosure relates to a technology for controlling the behavior of a vehicle.

2. Description of Related Art

Japanese Unexamined Patent Application Publication No. 2008-137446 (JP 2008-137446 A) discloses a technology for controlling the roll rigidity of a vehicle using active stabilizers. The active stabilizer includes an actuator that applies a control force to a wheel of the vehicle by rotating a torsion bar portion of the stabilizer. JP 2008-137446 A describes controlling the actuator to achieve an optimum roll rigidity regardless of the state of turning motion of the vehicle. In particular, JP 2008-137446 A describes position control (angle control) on the actuator.

SUMMARY

As described in JP 2008-137446 A, an active suspension, an active stabilizer, or the like is used in the technology for controlling the behavior of a vehicle. In the active suspension and the active stabilizer, the behavior of the vehicle is controlled by controlling the actuator. The actuator generally applies a control force to a wheel via a member such as a torsion bar.

The actuator operates to meet a control request. The output of the actuator has an upper limit. When the output of the actuator reaches the output upper limit due to the request for the actuator, active vehicle behavior control cannot be performed. This causes a decrease in comfort. In particular, in the case of position control on the actuator, the output of the actuator includes a reaction force component generated in the member such as the torsion bar due to acceleration or deceleration or steering of the vehicle. Hitherto, the output of the actuator may reach the output upper limit due to the output of the reaction force component, and the period during which the active vehicle behavior control cannot be performed may increase.

In view of the above problem, an object of the present disclosure is to provide a technology capable of shortening a period during which active vehicle behavior control cannot be performed when performing position control on an actuator.

One aspect of the present disclosure relates to a vehicle behavior control device. The vehicle behavior control device includes: a controller; and an actuator configured to apply a control force to a wheel of a vehicle through position control by the controller. The actuator includes a transmission member configured to transmit a reaction force generated by deformation to the wheel. The actuator is configured to apply the control force to the wheel by deforming the transmission member. The controller is configured to: calculate a request control force for the actuator; adjust the request control force in consideration of an assumed reaction force; and perform the position control on the actuator based on the adjusted request control force. The assumed reaction force is a reaction force to be generated in the transmission member due to at least one of acceleration or deceleration and steering of the vehicle when a position control amount of the actuator is zero.

According to the present disclosure, it is possible to shorten a period during which the output of the actuator exceeds the output upper limit. As a result, the period during which the active vehicle behavior control cannot be performed is shortened, and the comfort can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart illustrating a first example of a process flow related to the vehicle behavior control device according to the embodiment;

FIG. 5 is a flow chart illustrating a first exemplary process flow related to the vehicle behavior control device according to the embodiment.

DETAILED DESCRIPTION OF EMBODIMENTS

1. First Embodiment

1.1. Configuration of Vehicle Behavior Control Device

Figure 1:
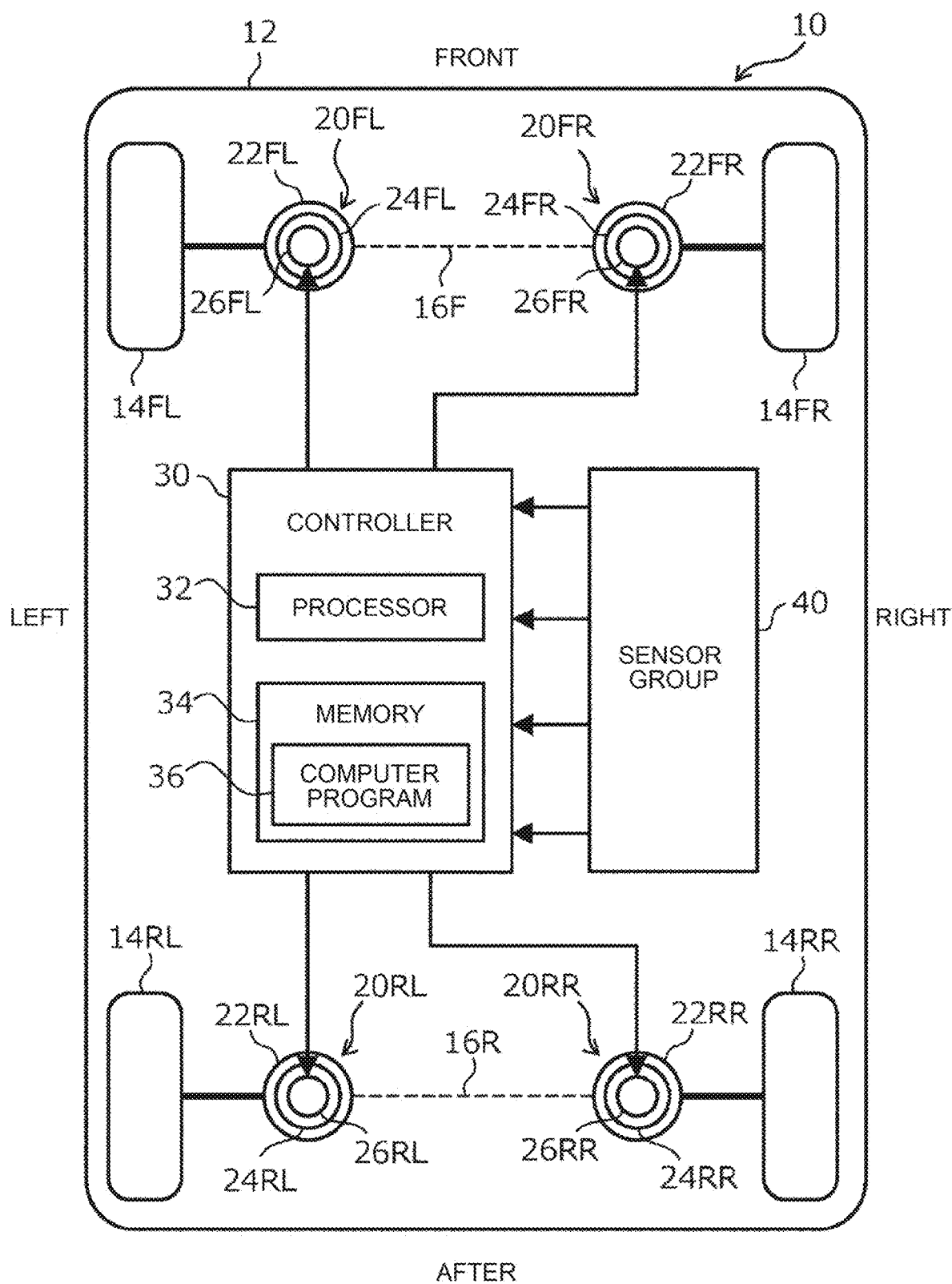
FIG. 1 is a diagram illustrating a configuration example of a vehicle behavior control device according to an embodiment.

FIG. 1 is a schematic diagram illustrating a configuration example of a vehicle behavior control device that controls the behavior of a vehicle 10 according to a first embodiment. The vehicle 10 includes a left front wheel 14FL and a right front wheel 14FR in a front axis 16F, and includes a left rear wheel 14RL and a right rear wheel 14RR in a rear axis 16R. The vehicle behavior control device includes suspensions 20FL, 20FR, 20RL, 20RR, a controller 30, and a sensor group 40.

The suspension 20FL is provided with respect to the left front wheel 14FL, and suspends the left front wheel 14FL from the vehicle body 12. The suspension 20FL includes an actuator 26FL in addition to the spring 22FL and the shock absorber 24FL. The actuator 26FL is configured to actively apply a vertical control force to the left front wheel 14FL.

The suspension 20FR is provided with respect to the right front wheel 14FR, and suspends the right front wheel 14FR from the vehicle body 12. The suspension 20FR includes an actuator 26FR in addition to the spring 22FR and the shock absorber 24FR. The actuator 26FR is configured to actively apply a vertical control force to the right front wheel 14FR.

The suspension 20RL is provided for the left rear wheel 14RL, and suspends the left rear wheel 14RL from the vehicle body 12. The suspension 20RL includes an actuator 26RL in addition to the spring 22RL and the shock absorber 24RL. The actuator 26RL is configured to actively apply a vertical control force to the left rear wheel 14RL.

The suspension 20RR is provided for the right rear wheel 14RR, and suspends the right rear wheel 14RR from the vehicle body 12. The suspension 20RR includes an actuator 26RR in addition to the spring 22RR and the shock absorber 24RR. The actuator 26RR is configured to actively apply a vertical control force to the right rear wheel 14RR.

Each of the suspensions 20FL, 20FR, 20RL, 20RR is a so-called fully active suspension. An example of the configuration of each actuator 26 of the suspensions 20FL, 20FR, 20RL, 20RR will be described later in "1.2 Example of Actuator Configuration".

The controller 30 are connected to the sensor group 40 via an in-vehicle network such as a CAN (Controller Area Network). The controller 30 acquires a signal from the sensor group 40. The sensor group 40 includes, for example, a sensor that measures a physical quantity related to the behavior of the vehicle 10, such as an acceleration sensor, a vehicle height sensor, and a wheel speed sensor. The controller 30 is also connected to the actuators 26FL, 26FR, 26RL, 26RR via an in-vehicle network.

The controller 30 includes a processor 32 and a memory 34 coupled to the processor 32. The processor 32 executes various processes. The memory 34 stores a computer program 36 executable by the processor 32 and various related information. The computer program 36 may be recorded in a computer-readable recording medium. The function of the controller 30 is realized by the cooperation of the processor 32 executing the computer program 36 and the memory 34.

The controller 30 executes vehicle behavior control for controlling the behavior of the vehicle 10. Examples of the vehicle behavior control include sprung feedback control, unsprung feedback control, attitude control, and preview control. The sprung feedback control suppresses vibration of the sprung member based on the sprung state quantity calculated by using the measurement value of the sprung acceleration sensor. The unsprung feedback control suppresses vibration of the unsprung member based on the unsprung state quantity calculated by using the measured values of the sprung acceleration sensor and the vehicle height sensor. The attitude control controls the attitude with respect to steering and acceleration/deceleration. In the preview control, a road surface state is pre-read using a database of camera images and high-precision map data, and vibration is suppressed. These various controls may be combined.

By controlling the actuators 26FL, 26FR, 26RL, 26RR of the suspensions 20FL, 20FR, 20RL, 20RR based on the signals obtained by the sensor group 40, the controller 30 performs vehicle-behavior control. In the vehicle behavior control, a required control force in the vertical direction is calculated for each wheel 14 of the vehicle 10 according to the purpose. In the first embodiment, the required control force for the wheels 14FL, 14FR, 14RL, 14RR corresponds to the required control force for the actuators 26FL, 26FR, 26RL, 26RR. The controller 30 controls each actuator 26 so that the control force applied to each wheel 14 becomes the calculated required control force. Thus, a desired behavior of the vehicle 10 is realized.

In particular, the controller 30 controls each actuator 26 through position control. For example, the controller 30 calculates a position control amount for each actuator 26 so as to obtain a required control force for each actuator 26. The controller 30 performs position control of each actuator 26 in accordance with the calculated position control amount.

1.2. Example of Actuator Configuration

Figure 2:
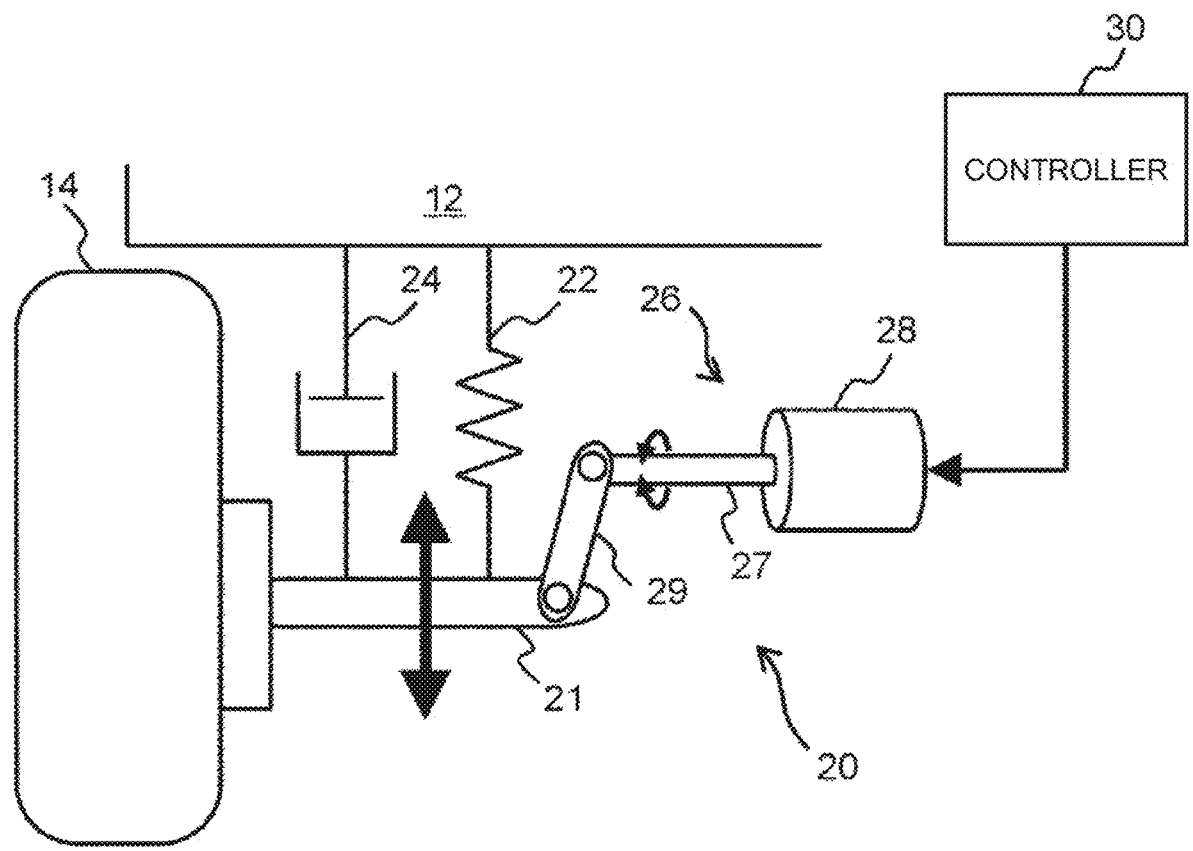
FIG. 2 is a diagram illustrating a configuration example of an actuator according to the embodiment.

FIG. 2 is a diagram for explaining an example of the configuration of the actuator 26. In the example shown in FIG. 2, the actuator 26 includes a motor 28 supported by a sprung structure and a torsion bar 27 coupled at one end to an output shaft of the motor 28. The other end of the torsion bar 27 is connected to an unsprung member 21 (e.g., a suspension arm) via a linkage 29. The operation of the motor 28 is controlled by the controller 30. In particular, the controller 30 performs position control (angle control) of the motor 28. Thus, in this case, the position of the actuator 26 indicates the angle of the motor 28. The position control amount is a target angle and a rotation angle amount of the motor 28.

When the motor 28 rotates under the control of the controller 30, the torsion bar 27 is deformed, and the reaction force of the torsion bar 27 is converted into a vertical force via the linkage 29 and transmitted to the unsprung member 21 and the wheel 14. In this way, the actuator 26 can actively apply a vertical control force to the unsprung member 21 and the wheel 14 by deforming the torsion bar 27.

In addition, when acceleration, deceleration, steering, and the like of the vehicle 10 are performed, an external force input from the unsprung member 21 side is transmitted to the output shaft of the motor 28 via the linkage 29 and the torsion bar 27. The torsion bar 27 and the linkage 29 may be a transmission member that transmits a force between the motor 28 and the unsprung member 21 and the wheel 14.

As described above, the actuator 26 according to the present embodiment includes the transmission member that transmits the reaction force generated by the deformation to the wheel 14, and is configured to apply the control force to the wheel 14 by deforming the transmission member. In the following, it is assumed that each actuator 26 is configured as described in FIG. 2. However, in the present embodiment, the structure of the actuator 26 and the design of the transmission member are not limited to those illustrated in FIG. 2.

1.3. Adjustment of the Required Control Force

There is, of course, an upper limit to the output of the actuator 26. In the vehicle behavior control, when the output of the actuator 26 reaches the output upper limit, the output of the actuator 26 cannot be interlocked with the required control force for the actuator 26. Therefore, the active vehicle behavior control cannot be performed while the output of the actuator 26 exceeds the output upper limit, and the comfort may be deteriorated. In particular, in the case of the active suspension of the torsion bar type, since the wheel rate increases due to the rigidity of the torsion bar 27, the body vibration tends to increase unless the vehicle behavior control is performed. If such a state continues, the comfort is greatly reduced.

Therefore, the controller 30 is configured to execute a process of adjusting a required control force for the actuator 26 (hereinafter, referred to as a "required control force adjustment process") in order to shorten a period in which the output of the actuator 26 exceeds the output upper limit. The controller 30 of the vehicle behavior control device according to the present embodiment controls the actuator 26 based on the adjusted required control force obtained by the required control force adjustment process.

In the vehicle behavior control device according to the present embodiment, the controller 30 controls the actuator 26 through position control. In the position control, the actuator 26 is controlled to maintain a position (angle of the motor 28) according to the position control amount while receiving an external force input from the unsprung member 21 side by acceleration/deceleration or steering of the vehicle 10. Therefore, when the position control of the actuator 26 is performed, the output of the actuator 26 includes an output corresponding to the reaction force generated in the torsion bar 27 by the external force input from the unsprung member 21 side in addition to the output corresponding to the required control force. The actuator 26 operates to satisfy the position control amount calculated in accordance with the required control force from the state when the position control amount is zero. Therefore, when the position control amount of the actuator 26 is assumed to be zero, the reaction force of the torsion bar 27 that requires the output of the actuator 26 corresponds to the reaction force (hereinafter, referred to as "assumed reaction force") generated in the torsion bar 27 due to the acceleration/ deceleration and the steering of the vehicle 10.

When the position control of the actuator 26 is performed as described above, the output of the actuator 26 may exceed the output upper limit due to the addition of the output corresponding to the assumed reaction force. In order to address this problem, in the required control force adjustment process, the controller 30 is configured to adjust the required control force, particularly in consideration of the assumed reaction force.

Figure 3A:
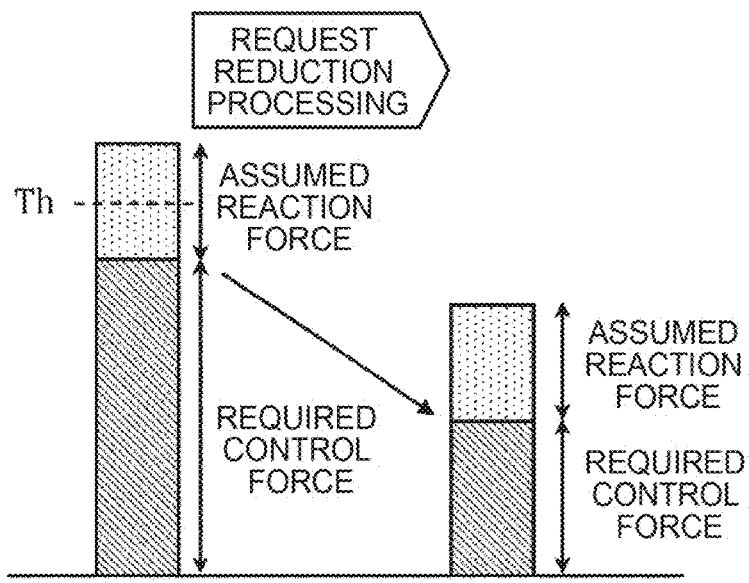
FIG. 3A is a diagram illustrating a first embodiment of a process for adjusting a required control force in view of an assumed reaction force.
Figure 3B:
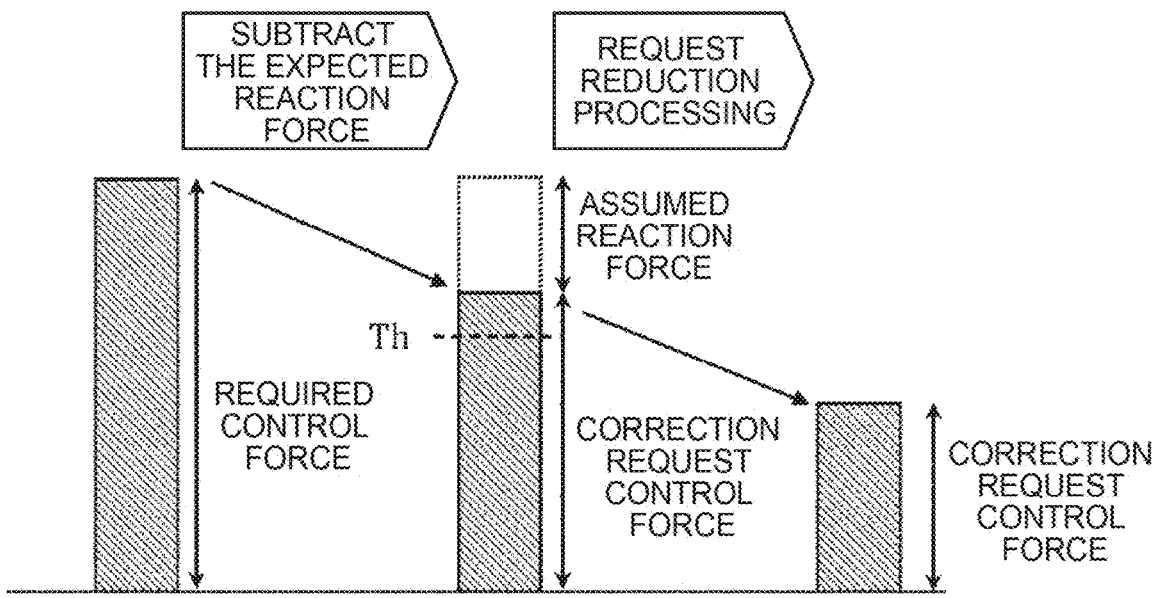
FIG. 3B is a diagram illustrating a second embodiment of a process for adjusting a required control force in view of an assumed reaction force.

FIGS. 3A and 3B are conceptual diagrams for explaining embodiments of the required control force adjusting process.

FIG. 3A is a diagram illustrating a first embodiment of a required control force adjusting process. In the request control force adjustment process according to the first embodiment, the controller 30 determines whether or not the sum of the request control force and the assumed reaction force exceeds an output range corresponding to the output capability of the actuator 26. The output range is represented by, for example, a predetermined threshold value. In FIG. 3A, the power-range is represented by a threshold Th. Here, the output range corresponding to the output capability of the actuator 26 does not necessarily have to match the maximum output possible range of the actuator 26. For example, the output range may be 70% of the maximum output possible range, etc. Information regarding the output range may be provided to the controller 30 in advance.

When the sum of the required control force and the assumed reaction force exceeds the output range, the controller 30 executes a process of reducing the required control force (hereinafter, also referred to as "request reduction process"). When the request reduction process is executed, the controller 30 controls the actuator 26 based on the request control force after the request reduction process. As a method of the request reduction processing, the following example can be considered.

The first example is to multiply the required control force by a predetermined coefficient $\alpha$ ($0<\alpha<1$). In this case, the coefficient $\alpha$ may be set to a smaller value as the difference between the sum of the required control force and the assumed reaction force and the threshold value (output range) is larger.

The second example is to reduce the required control force so that the sum of the required control force after the request reduction processing and the assumed reaction force falls within the output range. For example, the coefficient $\alpha$ to be applied to the required control force may be set based on a ratio between the required control force and a difference between the threshold value and the assumed reaction force.

A third example is to apply a high-pass filter to the required control force. Since the required control force tends to be larger for the low-frequency component, the required control force can be reduced by applying the high-pass filter. In this case, the larger the difference between the sum of the required control force and the assumed reaction force and the threshold value (output range), the higher the filter effect may be. By increasing the cutoff frequency of the high-pass filter or increasing the order of the high-pass filter, the filter effect can be enhanced.

A fourth example is to reduce the control gain of the vehicle behavior control. More specifically, the vehicle behavior control includes a first vehicle behavior control for a road surface input and a second vehicle behavior control for an operation input (steering, acceleration, or deceleration). The controller 30 calculates a required control force for the actuator 26 based on the first control gain of the first vehicle behavior control and the second control gain of the second vehicle behavior control. The request reduction process according to the fourth example reduces at least one of the first control gain and the second control gain. Then, the required control force is recalculated based on the reduced first control gain and the reduced second control gain. This also reduces the required control force on the actuator 26.

Combinations of two or more of the above-described request control processing examples are also possible. The request reduction process may also be configured to reduce all of the required control force for each actuator 26. For example, regarding the actuator 26FL, it is assumed that the sum of the required control force and the assumed reaction force exceeds the output range corresponding to the output capacity of the actuator 26FL. At this time, the controller 30 may execute the request reduction process so as to reduce all of the required control forces for each of the actuators 26FL, 26FR, 26RL, 26RR. The method of the request reduction processing may be the same as the above-described example. For example, the controller 30 performs a process of uniformly multiplying the required control force for each of the actuators 26FL, 26FR, 26RL, 26RR by a factor $\alpha$ ($0<\alpha<1$).

According to the first embodiment, it is determined whether or not the sum of the required control force and the assumed reaction force exceeds an output range corresponding to the output capability of the actuator 26. Thus, even when the position of the actuator 26 is controlled, it is possible to appropriately determine the possibility that the output of the actuator 26 reaches the output upper limit by the required control force. When the sum of the required control force and the assumed reaction force exceeds the output range, the request reduction process is executed. This reduces the required control force, thus reducing the likelihood that the output of the actuator 26 will reach the output upper limit. As a result, the period in which the output of the actuator 26 exceeds the output upper limit can be shortened. As a result, the period during which the active vehicle behavior control cannot be performed is shortened, and the comfort can be improved.

FIG. 3B is a diagram illustrating a second embodiment of the required control force adjusting process. In the request control force adjustment process according to the second embodiment, the controller 30 first executes a process of subtracting the assumed reaction force from the request control force. Thereafter, the controller 30 determines whether or not a value obtained by subtracting the assumed reaction force from the requested control force (hereinafter, referred to as "correction request control force") exceeds an output range corresponding to the output capability of the actuator 26.

Then, when the correction request control force exceeds the output range, the controller 30 executes a request reduction process for the correction request control force. The method of the request reduction processing may be the same as that described in the first embodiment. The controller 30 controls the actuator 26 based on the correction request control force. In particular, when the request reduction process is executed, the controller 30 controls the actuator 26 based on the correction request control force after the request reduction process.

According to the second embodiment, the assumed reaction force is subtracted from the calculated required control force. This makes it possible to reduce the output of the expected reaction force from the output of the actuator 26 in advance. As a result, it is possible to reduce the possibility that the output of the actuator 26 reaches the output upper limit due to the addition of the output corresponding to the assumed reaction force. Further, according to the second embodiment, when the correction request control force obtained by subtracting the assumed reaction force from the request control force exceeds the output range corresponding to the output capability of the actuator 26, the request reduction process is executed for the correction request control force. That is, when the output of the actuator 26 may reach the output upper limit by the correction request control force, the request control force is further reduced. Thus, the possibility that the output of the actuator reaches the output upper limit can be further reduced. In this way, also in the second embodiment, it is possible to shorten the period in which the output of the actuator 26 exceeds the output upper limit. As a result, the period during which the active vehicle behavior control cannot be performed is shortened, and the comfort can be improved.

As described above, the controller 30 of the vehicle behavior control device according to the present embodiment executes the required control force adjustment process of adjusting the required control force in consideration of the assumed reaction force. As a result, as described above, it is possible to shorten the period in which the output of the actuator 26 exceeds the output upper limit. As a result, the period during which the active vehicle behavior control cannot be performed is shortened, and the comfort can be improved.

In the request control force adjustment process, the controller 30 can calculate the assumed reaction force as follows. In the following description, the front/rear and front/rear axes are determined according to the mounting position of the target actuator 26.

First, with respect to the acceleration/deceleration input, the suspension sharing force $F_x$ of the wheel 14 excluding the suspension link reaction force is calculated by the following Equation (1).

Mathematical Formula 1

$$F_x = \frac{1}{2}\left\{-\left(\frac{H}{l}ma_{xp} - ma_{xp}\alpha_{xp}\tan\theta_I\right) + \left(\frac{H}{l}ma_{xm} - ma_{xm}\alpha_{xm}\tan\theta_I - ma_{xm}\alpha_{xm}(1-\alpha_k)\tan\theta_J\right)\right\} \quad (1)$$

Here, each parameter is defined as follows.

H: Sprung center of gravity height, l: wheel base, m: sprung mass, $a_{xp}$: acceleration side of front and rear G, $a_{xm}$: deceleration side of front and rear G, $\alpha_{xp}$: driving force distribution of front and rear, $\alpha_{xm}$: front/rear braking force distribution, $\alpha_k$: front/rear regeneration ratio, $\tan\theta_I$: side view suspension link inclination angle with respect to wheel center (point I), $\tan\theta_J$: side view suspension link inclination angle with respect to tire contact point (point J)

In the above Equation (1), the driving force and the regenerative force act on the point I. Further, the front and rear G of the vehicle 10 may be estimated based on a required torque or a required force of the engine or the drive motor, and a required force of braking or regeneration. Alternatively, it may be obtained by a sensor.

Next, with respect to the steering input, the suspension sharing force $F_y$ of the wheel 14 excluding the suspension link reaction force is calculated by the following Equation (2).

Mathematical Formula 2

$$F_y = \frac{H}{2T_i}ma_y\gamma - C_{pf}\left(\delta - \beta - \frac{l_i}{V}r\right)\tan\theta_y \quad (2)$$

Here, each parameter is defined as follows.

$T_i$: front/rear tread, $l_i$: distance between front/rear axis and center of gravity, β: body slip angle, V: vehicle speed, r: yaw rate, γ: Front/Rear Weighted Movement Allocation Ratio, $a_y$: Horizontal G, $C_{pf}$: Cornering power of front and rear wheels, $\tan\theta_y$: Back view suspension link inclination angle The horizontal G of the vehicle 10 may be estimated from a steering angle, a vehicle speed, and the like. Alternatively, it may be obtained by a sensor.

From the suspension sharing force $F_x$ of the wheel 14 related to the acceleration/deceleration input and the suspension sharing force $F_y$ of the wheel 14 related to the steering input, the assumed reaction force is calculated by $F_{xy}$ in the following Equation (3). Here, $K_{bf}$ is the stiffness of the torsion bar 27 (including the bushing effect and the link-efficiency), and $K_{sf}$ is the vertical stiffness of the suspension (excluding the torsion bar 27 minutes).

Mathematical Formula 3

$$F_{xy} = \frac{K_{bf}(F_x + F_y)}{K_{bf} + K_{sf}} \quad (3)$$

1.4. Processing Flow

Hereinafter, an example of a process flow related to the vehicle behavior control according to the present embodiment will be described.

1.4.1. First Example

FIG. 4 is a flowchart illustrating a first example of a process related to vehicle behavior control. The first example is a case where the request control force adjustment process according to the first embodiment is executed. In the flow chart shown in FIG. 4, the required control force adjusting process is a process related to S140 from S110. The processing according to the flowchart illustrated in FIG. 4 may be repeatedly executed at a predetermined processing cycle. Also, the process according to the flow chart shown in FIG. 4 shows the process performed with respect to the actuator 26 of one of the actuators 26FL, 26FR, 26RL, 26RR. The processes described below can be similarly applied for each actuator 26.

In S110, the controller 30 calculates the required control force for the actuators 26. In the first embodiment, the method of calculating the required control force is not particularly limited.

Next, in S120, the controller 30 calculates the assumed reaction forces (see Equations (1) to (3)).

Next, in S130, the controller 30 determines whether the sum of the required control force and the assumed reaction force exceeds an output range corresponding to the output capability of the actuator 26.

When the sum of the required control force and the assumed reaction force does not exceed the output range (S130; No), the controller 30 performs the vehicular behavior control by the position control of the actuator 26 based on the required control force without executing the request reduction process (S150).

When the sum of the required control force and the assumed reaction force exceeds the output range (S130; Yes), the controller 30 performs the request reduction process. The method of the request reduction processing is as described above. Thereafter, the controller 30 performs the vehicle-behavior control by the position control of the actuator 26 based on the request control force after the request reduction process (S150).

1.4.2. Second Example

FIG. 5 is a flowchart illustrating a second example of a process related to vehicle behavior control. The second example is a case where the request control force adjustment process according to the second embodiment is executed. In the flow chart shown in FIG. 5, the required control force adjusting process is a process related to S250 from S220. The processing according to the flowchart illustrated in FIG. 5 may be repeatedly executed at a predetermined processing cycle. Also, the process according to the flow chart shown in FIG. 5 shows the process performed with respect to the actuator 26 of one of the actuators 26FL, 26FR, 26RL, 26RR. The processes described below can be similarly applied for each actuator 26.

The processes related to S210 and S220 are the same as those of S110 and S120 described with reference to FIG. 4.

After S220, in S230, the controller 30 calculates the corrected required control force by subtracting the assumed reaction force from the required control force.

Next, in S240, the controller 30 determines whether the required corrective control force exceeds an output window corresponding to the output capability of the actuator 26.

When the correction request control force does not exceed the output range (S240; No), the controller 30 performs the vehicular behavior control by the position control of the actuator 26 based on the correction request control force without executing the request reduction process (S260).

When the correction request control force exceeds the output range (S240; Yes), the controller 30 performs a request reduction process on the correction request control force. Thereafter, the controller 30 performs position control of the actuators 26 based on the correction-request control force after the request reduction process (S260).

By the controller 30 executing the processing in this way, the vehicle behavior control device according to the present embodiment is realized. In addition, the controller 30 executes the processing in this manner, thereby implementing the vehicle behavior control method according to the present embodiment. In addition, the vehicle behavior control program according to the present embodiment is realized by the computer program 36 that causes the controller 30 to execute the processing in this way.

2. Second Embodiment

Hereinafter, a vehicle behavior control device according to a second embodiment will be described. In the following description, differences from the first embodiment are mainly described, and contents common to the first embodiment are omitted as appropriate.

2.1. Configuration of Vehicle Behavior Control Device

In the second embodiment, the suspension 20 of one of the suspensions 20FL, 20FR, 20RL, 20RR is an inactive suspension without the actuator 26. Hereinafter, it is assumed that the suspension 20FL provided for the left front wheel 14FL is an inactive suspension without the actuator 26. The configuration of the other suspensions 20FR, 20RL, 20RR may be the same as that of the first embodiment. That is, each of the suspensions 20FR, 20RL, 20RR is a full active suspension including the actuator 26. The configuration of the actuator 26 may be the same as that described in the above-described "1.2 Actuator Configuration Example".

In the vehicle behavior control device according to the second embodiment, the controller 30 performs desired vehicle behavior control by controlling the actuators 26FR, 26RL, 26RR of the suspensions 20FR, 20RL, 20RR based on the signals obtained by the sensor group 40. The vehicle behavior control device according to the second embodiment achieves the same controllability as when the actuators 26 are provided on all four wheels only by the three actuators 26FR, 26RL, 26RR. Hereinafter, the vehicular behavior control by the three actuators 26FR, 26RL, 26RR (hereinafter, also simply referred to as "three actuator control") will be described in more detail.

2.2. Actuator Control

Figure 6:
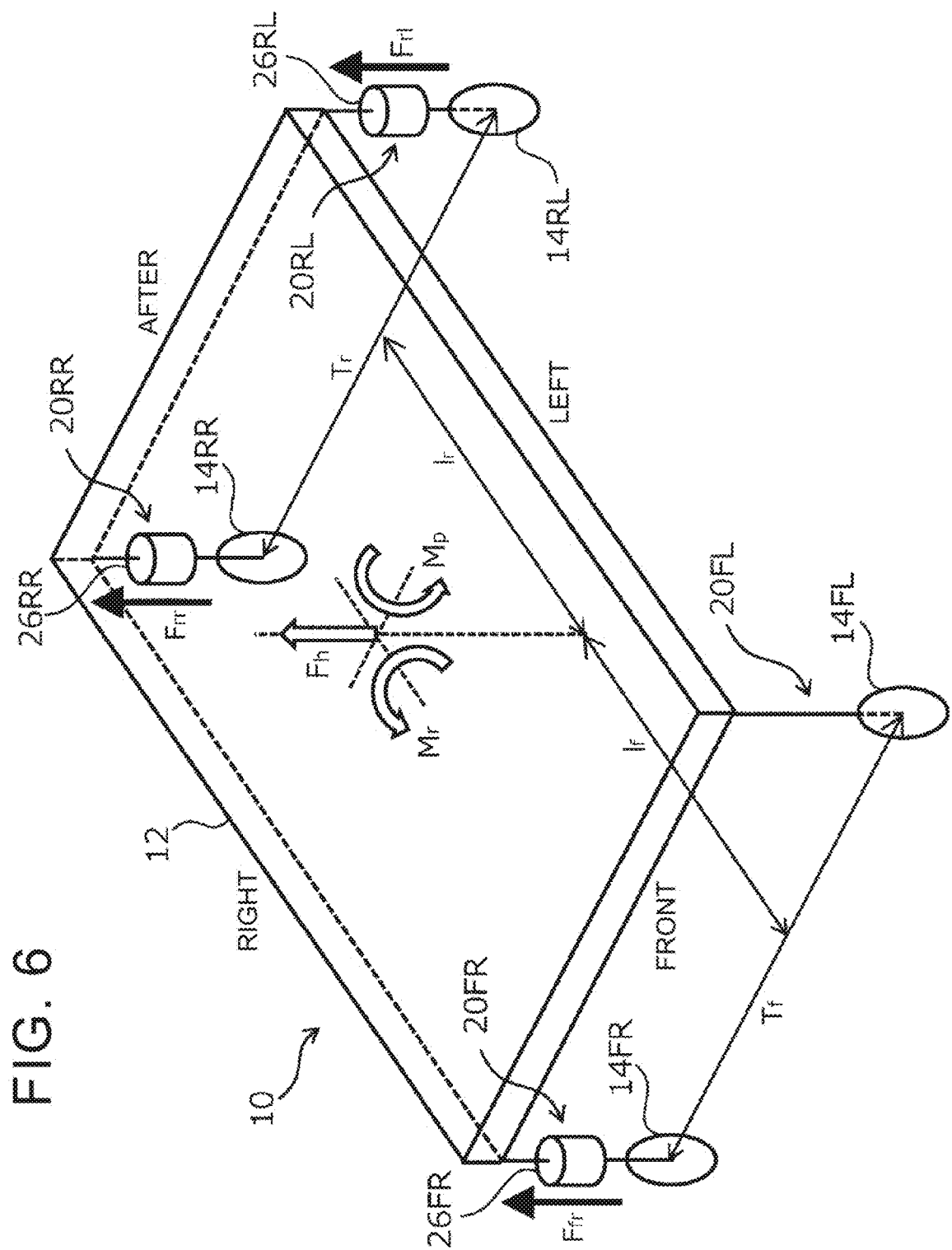
FIG. 6 is a diagram illustrating a behavior model for explaining vehicle behavior control by three actuators.

FIG. 6 shows a behavioral model for describing three-actuator control. The behavior of the vehicle 10 may be represented by a behavior parameter. In the behavioral model shown in FIG. 6, the behavioral parameters include the mode of motion at the sprung center of gravity position of the vehicle 10, i.e., the roll moment $M_r$, the pitch moment $M_p$, and the heave force $F_h$. Hereinafter, a motion mode including a roll moment $M_r$, a pitch moment $M_p$, and a heave force $F_h$ will be referred to as three modes of the center of gravity.

Also in the three-actuator control, the required control force in the vertical direction is calculated for each wheel 14 of the vehicle 10 according to the purpose of the vehicle behavior control. Specifically, a required control force $F_{fli}$ in the vertical direction with respect to the left front wheel 14FL, a required control force $F_{fri}$ in the vertical direction with respect to the right front wheel 14FR, a required control force $F_{rli}$ in the vertical direction with respect to the left rear wheel 14RL, and a required control force Fri in the vertical direction with respect to the right rear wheel 14RR are required. The controller 30 according to the second embodiment converts the required control forces $F_{fli}$, $F_{fri}$, $F_{rli}$, $F_{rri}$ for the four wheels into the required values of the three modes of the center of gravity according to Equation (4) below.

Mathematical Formula 4

$$\begin{bmatrix} F_h \\ M_r \\ M_p \end{bmatrix} = \begin{bmatrix} 1 & 1 & 1 & 1 \\ \frac{-T_f}{2} & \frac{T_f}{2} & \frac{-T_r}{2} & \frac{T_r}{2} \\ -l_f & -l_f & l_r & l_r \end{bmatrix} \begin{bmatrix} F_{fri} \\ F_{fli} \\ F_{rri} \\ F_{rli} \end{bmatrix} \quad (4)$$

In Equation (4), lf, lr, Tf, and Tr are the distance between the front axis 16F and the center of gravity, the distance between the rear axis 16R and the center of gravity, the front tread, and the rear tread, respectively (see FIG. 6). These parameters are given in advance as specification information of the vehicle 10. The controller 30 computes the requested value ($F_h$, $M_r$, $M_p$) of the three modes of the center of gravity, based on the specification information of the vehicle 10 and the required control forces $F_{fli}$, $F_{fri}$, $F_{rli}$, and Fri for the four wheels. The required value of the three modes of the center of gravity may include a roll moment, a pitch moment, and a heave force required for attitude control accompanying steering and acceleration/deceleration.

After the requested values $F_h$, $M_r$, $M_p$ of the three modes of the center of gravity are calculated, the controller 30 converts the requested values $F_h$, $M_r$, $M_p$ of the three modes of the center of gravity into the required control forces $F_{fr}$, $F_{rr}$, $F_{rl}$ for the three wheels 14FR, 14RR, 14RL according to Equation (5) below.

Mathematical Formula 5

$$\begin{bmatrix} F_{fr} \\ F_{rr} \\ F_{rl} \end{bmatrix} = \begin{bmatrix} 1 & 1 & 1 \\ \frac{-T_f}{2} & \frac{-T_r}{2} & \frac{T_r}{2} \\ -l_f & l_r & l_r \end{bmatrix}^{-1} \begin{bmatrix} F_h \\ M_r \\ M_p \end{bmatrix} \quad (5)$$

In the vehicle behavior control device according to the second embodiment, $F_{fr}$, $F_{rr}$, and $F_{rl}$ obtained by the conversion of Equation (5) correspond to the required control force for the three actuators 26FR, 26RR, 26RL. The controller 30 controls the respective actuators 26 such that the control force applied to the wheels 14FR, 14RR, 14RL of the actuator is the required control forces $F_{fr}$, $F_{rr}$, $F_{rl}$ for the actuators 26FR, 26RR, 26RL, respectively. In particular, the controller 30 controls each actuator 26 through position control.

As described above, the vehicle behavior control device according to the second embodiment realizes the desired vehicle 10 behavior including all of the roll, the pitch, and the heave by distributing the requested value of three modes of the center of gravity to the three actuators 26FR, 26RR, 26RL. That is, the desired vehicular behavior can be realized by only three actuators 26FR, 26RR, 26RL. It is preferable that the required actuator can be reduced from the viewpoints of improvement in mountability, reduction in cost, reduction in weight, power saving, and the like.

In the above explanation, it is assumed that the suspension 20FL provided for the left front wheel 14FL is an inactive suspension that does not include the actuator 26. However, the present embodiment is not limited thereto. Instead of the left front wheel 14FL, the suspension 20 for the other wheels 14 may be an inactive suspension.

2.3. Adjustment of Required Control Force

The controller 30 according to the second embodiment is also configured to execute a required control force adjustment process in order to shorten a period in which the output of the actuator 26 exceeds the output upper limit. The required control force adjusting process according to the second embodiment can be executed in the same manner as the process described in the first embodiment (refer to FIGS. 3A to 5). However, as described above, in the second embodiment, the required control force for each actuator 26 is calculated by using the above-described Equations (4) and (5).

Also in the second embodiment, it is possible to shorten the period in which the output of the actuator 26 exceeds the output upper limit by executing the required control force adjustment process. As a result, the period during which the active vehicle behavior control cannot be performed is shortened, and the comfort can be improved. In the case of three actuator control, each actuator 26 also covers control over the wheels 14 where no actuator 26 is provided. Therefore, when the output of a certain actuator 26 reaches the output upper limit, there is a possibility that a sense of discomfort with respect to the vehicle behavior may occur. As described above, in the second embodiment, the execution of the required control force adjustment process has an effect of suppressing the occurrence of a sense of discomfort with respect to the vehicle behavior.

3. Other Embodiments

The vehicle behavior control device described above can be suitably applied to a vehicle behavior control device having another configuration including an actuator. For example, the present disclosure can be applied to a vehicle behavior control device configured by an active stabilizer for controlling the roll direction of the vehicle 10. In this case, the vehicle behavior control device performs vehicle behavior control by controlling the position of the actuator 26 of the active stabilizer. The transmission member for the actuator 26 serves as a stabilizer.

What is claimed is:

1. A vehicle behavior control device comprising:
a controller; and
an actuator configured to apply a control force to a wheel of a vehicle through position control by the controller, wherein
the actuator includes a transmission member configured to transmit a reaction force generated by deformation to the wheel,
the actuator is configured to apply the control force to the wheel by deforming the transmission member,
an assumed reaction force is a reaction force to be generated in the transmission member due to at least one of acceleration or deceleration and steering of the vehicle when a position control amount of the actuator is zero, and the controller is configured to:
- calculate a request control force for the actuator;
- adjust the request control force in consideration of the assumed reaction force; and
- perform the position control on the actuator based on the adjusted request control force.

2. The vehicle behavior control device according to claim 1, wherein adjustment of the request control force in consideration of the assumed reaction force includes reducing the request control force when a sum of the request control force and the assumed reaction force exceeds an output range associated with an output capability of the actuator.

3. The vehicle behavior control device according to claim 1, wherein adjustment of the request control force in consideration of the assumed reaction force includes subtracting the assumed reaction force from the request control force.

4. The vehicle behavior control device according to claim 3, wherein adjustment of the request control force in consideration of the assumed reaction force includes further reducing the request control force when a value obtained by subtracting the assumed reaction force from the request control force exceeds an output range associated with an output capability of the actuator.

5. A vehicle behavior control method for controlling a behavior of a vehicle,
- the vehicle including an actuator configured to apply a control force to a wheel of the vehicle through position control,
- the actuator including a transmission member configured to transmit a reaction force generated by deformation to the wheel,
- the actuator being configured to apply the control force to the wheel by deforming the transmission member,
- an assumed reaction force being a reaction force to be generated in the transmission member due to at least one of acceleration or deceleration and steering of the vehicle when a position control amount of the actuator is zero,
- the vehicle behavior control method comprising:
- calculating a request control force for the actuator;
- adjusting the request control force in consideration of the assumed reaction force; and
- performing the position control on the actuator based on the adjusted request control force.

\* \* \* \* \*